United States Patent
Jerger et al.

[11] Patent Number: 5,899,062
[45] Date of Patent: May 4, 1999

[54] CATALYST MONITOR USING ARC LENGTH RATIO OF PRE- AND POST-CATALYST SENSOR SIGNALS

[75] Inventors: Robert Joseph Jerger, Livonia; Christopher Kirk Davey, Novi; Michael I. Kluzner, Oak Park; David R. Nader, Farmington Hills, all of Mich.

[73] Assignee: Ford Global Technologies, Inc., Dearborn, Mich.

[21] Appl. No.: 08/785,406

[22] Filed: Jan. 22, 1997

[51] Int. Cl.$^6$ ........................................................ F01N 3/20
[52] U.S. Cl. ................................... 60/274; 60/276; 60/277
[58] Field of Search ............................ 60/274, 276, 277; 73/118.1; 123/688

[56] References Cited

U.S. PATENT DOCUMENTS

| | | | |
|---|---|---|---|
| 4,553,214 | 11/1985 | Dettmer | 345/443 |
| 5,279,116 | 1/1994 | Shimizu et al. | 60/277 |
| 5,301,501 | 4/1994 | Shimizu et al. | 60/277 X |
| 5,349,816 | 9/1994 | Sanbayashi et al. | 60/277 |
| 5,359,853 | 11/1994 | Shimizu | 60/276 |
| 5,426,934 | 6/1995 | Hunt et al. | 60/276 |
| 5,545,377 | 8/1996 | Fukaya et al. | 60/276 X |
| 5,595,060 | 1/1997 | Togai et al. | 60/277 X |
| 5,657,625 | 8/1997 | Koga et al. | 60/274 |

OTHER PUBLICATIONS

Abstract of JP–07–293233, Nov. 1995.
Abstract of JP–06–330741, Nov. 1994.
Abstract of JP–08–004522, Jan. 1996.
"Patent Abstracts of Japan", vol. 18, No. 123(M1568), Abstract of JP–05–312026, Feb. 1994.
"Patent Abstracts of Japan", vol. 18, No. 360(M1634), Abstract of JP–06–093845, Jul. 1994.
"Patent Abstracts of Japan", vol. 15, No. 329(M1149), Abstract of JP–03–124909, Aug. 1991.

*Primary Examiner*—Tony M. Argenbright
*Attorney, Agent, or Firm*—Allan J. Lippa; Roger L. May

[57] ABSTRACT

A method and system for monitoring the efficiency of a catalytic converter include determining a ratio of signal arc lengths from an upstream exhaust gas sensor and a downstream exhaust gas sensor which generate signals indicative of oxygen content in the exhaust upstream and downstream, respectively, relative to the converter. A controller processes the signals to determine the ratio of the arc length of the rear or downstream sensor signal to the arc length of the front or upstream sensor signal over a test period. The arc length is calculated by summing over the test period a series of incremental arc lengths for each incremental time interval in the test period. An incremental signal length may be calculated using the square root of the sum of the square of the change in value of a signal during an incremental time interval and the square of the duration of the incremental time interval. The ratio is indicative of the efficiency of the converter which may be compared with subsequently generated ratios to monitor converter efficiency over time.

7 Claims, 2 Drawing Sheets

CATALYST MONITOR USING ARC LENGTH RATIO OF PRE- AND POST-CATALYST SENSOR SIGNALS

TECHNICAL FIELD

The present invention relates to a method and system for determining the efficiency of a catalytic converter based on signals generated by pre- and post-catalyst exhaust gas sensors.

BACKGROUND ART

Increasingly stringent federal regulations limit the permissible levels for emissions. As such, vehicle manufacturers have developed various methods to reduce emissions while improving vehicle performance and fuel economy. Catalytic converters are often used to reduce emission levels of regulated exhaust gases. The conversion efficiency of a catalytic converter may be monitored using a pre-catalyst oxygen sensor (HEGO sensor) positioned upstream from the catalytic converter and a post-catalyst oxygen sensor (catalyst monitor sensor or CMS) positioned downstream from the catalytic converter.

One method known for indicating conversion efficiency of the catalyst is to calculate a ratio of the accumulated number of CMS transitions or switches to the accumulated number of HEGO transitions or switches. An increasing switch ratio is generally indicative of a degrading catalyst. When the switch ratio exceeds a threshold value, a malfunction indicator light (MIL) is illuminated to alert the vehicle operator.

Another known method for indicating conversion efficiency of the catalyst determines a ratio based on an accumulated per sample change in magnitude of CMS sensor voltage relative to a corresponding change in magnitude of the HEGO sensor voltage.

DISCLOSURE OF THE INVENTION

A general object of the present invention to provide a method and system for determining the efficiency of a catalytic converter having superior sensitivity and repeatability.

In carrying out the above object and other objects, features and advantages of the present invention, a system for monitoring exhaust gas conversion efficiency of a catalytic converter during operation of an internal combustion engine is provided.

The system includes an upstream exhaust gas sensor interposed the engine and the catalytic converter for generating a first signal based on the exhaust gas upstream of the converter and a downstream exhaust gas sensor interposed the catalytic converter and atmosphere for generating a second signal based on the exhaust gas downstream of the converter. The system also includes control logic in communication with the upstream and downstream exhaust gas sensors for processing the first and second signals to determine corresponding first and second signal arc lengths and monitoring the conversion efficiency of the catalytic converter based on the first and second signal arc lengths. In one embodiment, the system includes control logic for summing a series of incremental arc lengths for each of the first and second signals to determine the corresponding first and second signal arc lengths. The system may also determine a ratio indicative of the conversion efficiency of the catalytic converter based on the first and second signal arc lengths.

A computer readable storage medium including control logic such as the control logic described above is also provided.

In further carrying out the above object and other objects, features and advantages of the present invention, a method is provided for monitoring performance of a catalytic converter coupled to an exhaust of an engine including an upstream exhaust gas sensor disposed between the engine and the catalytic converter and a downstream exhaust gas sensor disposed between the catalytic converter and atmosphere. The upstream and downstream exhaust gas sensors generate first and second signals based on the exhaust before and after the catalytic converter, respectively.

The method includes sampling the first and second signals to generate at least two signal samples for each of the first and second signals, determining corresponding incremental arc lengths for the first and second signals based on the at least two signal samples and elapsed time between the at least two signal samples, and monitoring the performance of the catalytic converter based on the arc lengths for the first and second signals. In one embodiment, the method includes determining an arc length ratio based on the incremental arc lengths of the first and second signals. The method may also include generating accumulated arc lengths for the first and second signals based on corresponding sums of previously determined incremental arc lengths and determining an arc length ratio based on the accumulated arc lengths.

The present invention includes a number of attendant advantages. For example, the present invention provides increased sensitivity for monitoring a catalyst over known systems and methods. The catalyst conversion efficiency indicator of the present invention is particularly suited to detect subtle changes in a downstream sensor signal by including both the horizontal and vertical components of the sensor signal as compared to prior systems and methods which rely primarily on the magnitude or vertical component of the signals.

The above object and other objects, features, and advantages of the present invention, as well as others, are readily apparent from the following detailed description of the best mode for carrying out the invention when taken in connection with the accompanying drawings.

BEST MODE(S) FOR CARRYING OUT THE INVENTION

Figure 1:
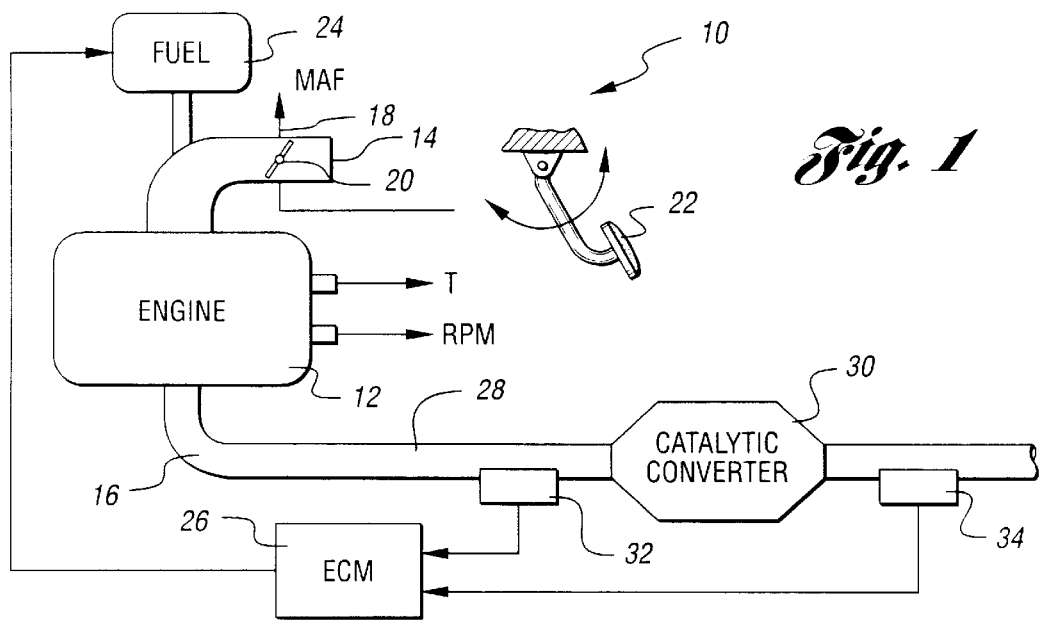
FIG. 1 is a block diagram of the present invention.

Referring now to FIG. 1, a block diagram illustrating one embodiment of a system for monitoring performance or conversion efficiency of a catalytic converter is shown. System 10 includes an internal combustion engine 12 having an intake manifold 14 and exhaust manifold 16. Airflow through intake manifold 14 is measured by mass air flow (MAF) sensor 18 and regulated by throttle valve 20. A throttle position sensor (TPS) provides a signal indicative of position of throttle valve 20 or an associated accelerator pedal 22. A conventional fuel supply 24 provides fuel which is mixed with the air in intake manifold 14 to provide a combustion mixture which is controlled by an engine controller, such as Engine Control Module (ECM) 26. Of course, ECM 26 may perform control and monitoring functions for various vehicle systems and subsystems in addition to controlling and monitoring engine 12.

An exhaust pipe 28 couples catalytic converter 30, preferably a three-way converter (TWC) to the exhaust stream of engine 12. Catalytic converter 30 is monitored via an upstream exhaust gas sensor 32 and a downstream exhaust gas sensor 34 in communication with the engine controller 26. Upstream sensor 32 is interposed engine 12 and catalytic converter 30 whereas downstream sensor 34 is interposed catalytic converter 30 and atmosphere. Upstream (front) sensor 32 is preferably an exhaust gas oxygen sensor, commonly referred to as a HEGO sensor, which provides an indication of presence or absence of oxygen in the exhaust stream. Downstream (rear) sensor 34 operates in a similar fashion as upstream sensor 32 but is commonly referred to as a catalyst monitor sensor (CMS) due to its intended function in the exhaust system. Any of a number of exhaust gas sensors may be utilized including lambda sensors, proportional oxygen sensors, and the like, to determine conversion efficiency of the catalyst according to the present invention.

ECM 26 includes a microprocessor and various computer readable storage media, which may include but are not limited to a read only memory (ROM), a random access memory (RAM), and a keep-alive memory (KAM). The computer readable storage media may be implemented by any of a number of known volatile and non-volatile storage devices including but not limited to PROM, EPROM, EEPROM, flash memory, and the like, all of which are well known in the art. RAM is typically used for temporary data storage of various operating variables which are lost when the engine ignition is turned off, such as counters, timers, status flags, and the like. KAM is generally used to store learned or adaptive values which may change over time. The contents of KAM are maintained as long as some power is provided to ECM 26. Preferably, one or more ROMs within ECM 26 contains control logic implemented by program instructions executed by the microprocessor along with various system parameter values and calibrations.

ECM 26 receives signals from upstream and downstream exhaust gas sensors 32 and 34, respectively, which reflect current operating conditions of engine 12 and catalyst 30. For example, when at or above operating temperature, HEGO sensor 32 provides a continuous signal (preferably a voltage) to ECM 26 based on the presence or absence of oxygen in exhaust pipe 28. The voltage signal is indicative of the excursion from the stoichiometric combustion mixture of the exhaust gases in exhaust manifold 16. Preferably, the HEGO sensor signals are two-state signals having a predetermined high voltage when exhaust gases indicate a rich mixture and a predetermined low voltage when exhaust gases indicate a lean mixture. CMS 34 monitors catalytic converter 30 by detecting the presence or absence of oxygen downstream from converter 30 and provides a voltage signal to ECM 26.

Various other sensors communicate with ECM 26 to facilitate control and monitoring functions. Sensors may include a coolant temperature sensor (T), engine speed sensor (RPM), and the like.

ECM 26 uses control logic implemented in hardware and/or software to generate various signals to control and monitor operation of engine 12. For example, controller 26 generates an output signal to electronic fuel injectors, represented by fuel supply 24, to control the quantity and timing of fuel delivered to engine 12. ECM 26 is also used to monitor performance of catalytic converter 30 using HEGO sensor 32 and CMS 34. The sensor signals are filtered, periodically sampled, and stored within ECM 26 to monitor performance of catalytic converter 30 as described in detail with reference to FIG. 3

Figure 2A:
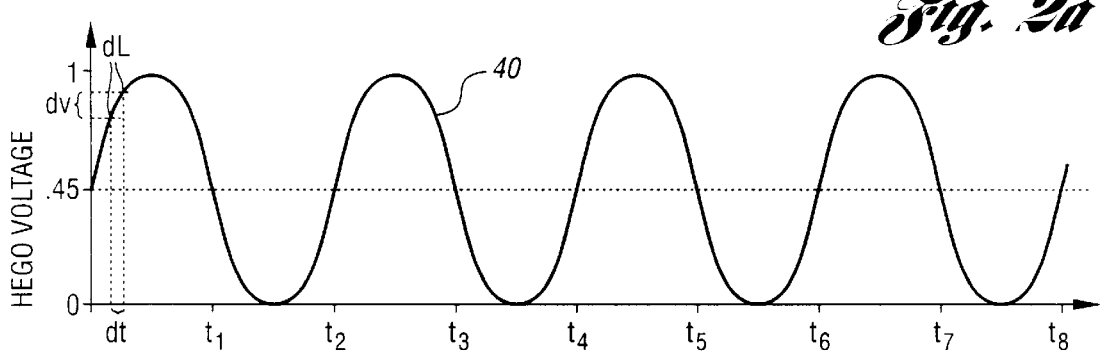
FIG. 2a is a graph of a signal provided by an upstream or front exhaust gas sensor.
Figure 2B:
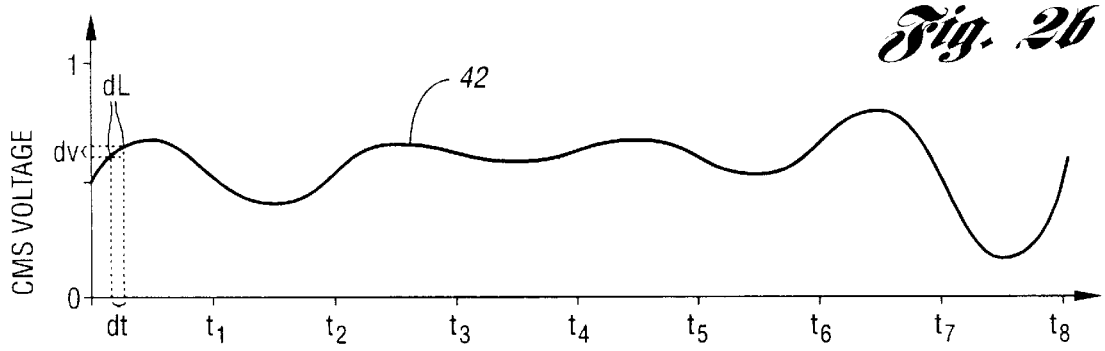
FIG. 2b is a graph of a signal provided by a downstream or rear sensor for a catalytic converter having a high exhaust gas conversion efficiency.
Figure 2C:
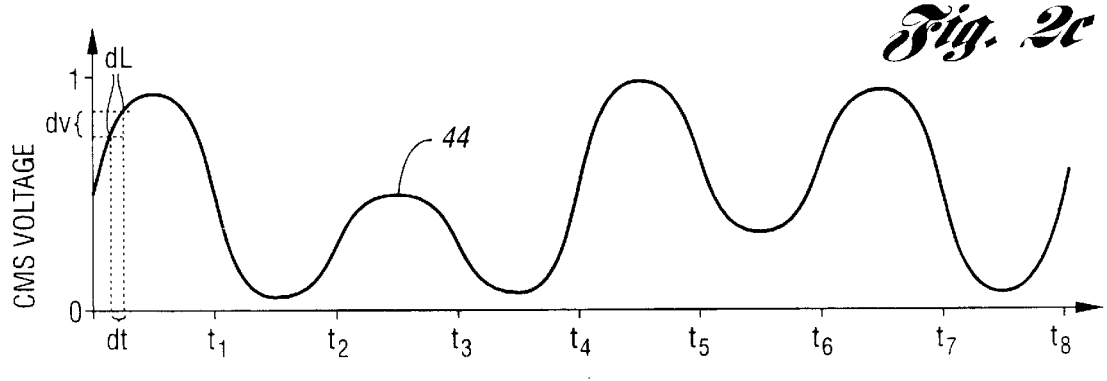
FIG. 2c is a graph of a signal provided by a rear sensor for a catalytic converter having a low efficiency.

Referring now to FIGS. 2a–2c, representative voltage signals generated by sensors 32 and 34 are shown. FIG. 2a illustrates an upstream voltage signal from HEGO sensor 32 as a function of time. Upstream signal 40 oscillates through a switch point of 0.45 volts between a high voltage and a low voltage in response to the combustion mixture oscillating about the stoichiometric ratio during closed loop control.

FIG. 2b shows a representative downstream voltage signal 42 provided by CMS sensor 34 as a function of time for a catalyst having a relatively high conversion efficiency. Although the frequency of downstream signal 42 is the same as the frequency of upstream signal 40, downstream signal 42 has a much different variation in amplitude than upstream signal 40 and is phase shifted due to the propagation delay of exhaust gases passing through the converter. The amplitude variation or excursion of downstream signal 42 is much less than that of upstream signal 40 due to the operation of the catalytic converter in converting the exhaust gases. As such, prior art systems and methods which rely on amplitude variation of the CMS signal are less sensitive to variations induced by catalyst degradation. In contrast, the present invention provides superior sensitivity by incorporating the time-based or horizontal component of the sensor signal into the catalyst efficiency indicator as explained in greater detail with reference to FIG. 3.

FIG. 2c illustrates a representative downstream voltage signal 44 provided by CMS sensor 34 as a function of time. In this case, the amplitude variation of downstream signal 44 is much greater than the variation of downstream signal 42. A signal similar to signal 44 results from an aged and deteriorated catalyst having a low conversion efficiency.

System 10 recognizes that as a catalyst ages and deteriorates, the arc length of the voltage signal provided by CMS sensor 34 generally increases for a given period of time. The arc length or path distance traversed by the voltage signal may be determined using the line integral of the voltage signal. For example, for a given period of time beginning at t=a and ending at t=b, and where dL represents the length of a infinitesimal incremental line segment on the signal, the arc length may be determined according to:

$$\text{Arc Length} = \int_a^b dL \quad (1)$$

However, one of ordinary skill in the art will recognize that analytical or parametric equations for the sensor signals are generally not available to compute the line integral. In addition, while many sensor signals are continuous, engine controllers generally implement discrete digital control using sampled signal values. As such, the arc length of the sensor signals is preferably determined using any of a number of approximations for the line integral.

In one embodiment of the present invention, a linear approximation of the line integral is determined by calculating and accumulating incremental arc lengths. The arc length of the signal for a given period of time may be determined by dividing the time period into n equal time sub-intervals as follows:

$$a = t_0 < t_1 < t_2 < t_3 < t_{n-1} < t_n = b \quad (2)$$

Each of the time sub-intervals has a duration (dT) given by:

$$dT = \frac{a-b}{n} \quad (3)$$

Alternatively, each time interval may be represented by:

$$\Delta T = t_{i+1} - t_i \quad (4)$$

Preferably, the time sub-intervals correspond to processing loops within the engine controller. As such, the sensor signals may be sampled once during each loop such that adjacent samples of the sensor signals may be used in the various calculations to determine arc lengths according to the present invention.

A linear approximation of each incremental arc length (dL) may be computed using the Pythagorean theorem. As such, the incremental arc length is approximately equal to the square root of the sum of the square of the change in amplitude (dV) of the sensor signal during the time sub-interval and the square of the duration of the time sub-interval (dT) according to:

$$dL \approx \sqrt{(dV)^2 + (dT)^2} \quad (5)$$

or alternatively:

$$\Delta L = \sqrt{\Delta V^2 + \Delta T^2} \quad (6)$$

such that:

$$\Delta L \approx \sqrt{(V_{i+1} - V_i)^2 + (t_{i+1} - t_i)^2} \quad (7)$$

The incremental arc lengths of the sensor signal for each time sub-interval are then accumulated or summed as follows:

$$\sum_{i=o}^{n} dL_i \quad (8)$$

or alternatively:

$$\sum_{i=o}^{n} \Delta L_i$$

As the duration of the time sub-intervals decreases, the linear approximation provides a better estimate of the line integral for a particular signal segment corresponding to the time period of interest. Of course, various other approximations to determine the signal arc length and/or line integral may be utilized to accomplish the objects and advantages of the present invention.

Application of the above equations to the representative signals of FIGS. 2a–2c results in an arc length for upstream signal 40 which is greater than the arc length of downstream signal 44. Likewise, downstream signal 42 has the smallest arc length of the representative signals shown. Assuming a relatively consistent upstream sensor signal as illustrated in FIG. 2a, the ratio of the arc length of a downstream signal to the upstream signal will increase as the catalyst ages and representative signals change from that illustrated in FIG. 2b to the signal illustrated in FIG. 2c. The present invention uses both the magnitude (vertical component) and the corresponding elapsed time (horizontal component) to provide a monitor with increased sensitivity, especially for signals such as illustrated in FIG. 2b.

In operation, ECM 26 receives a first signal from upstream exhaust gas sensor 32 and a second signal from downstream exhaust gas sensor 34. ECM 26 samples the first and second signals and determines corresponding incremental arc lengths based on the signal samples and elapsed time between the samples, i.e. ECM 26 uses adjacent or consecutive signal samples for each signal to determine a corresponding incremental arc length based on the change in signal amplitude and time duration. Of course, non-consecutive signal samples may be used to provide a less computationally intensive but coarser approximation to the signal arc lengths.

ECM 26 may generate an accumulated arc length for each of the first and second signals based on corresponding sums of previously determined incremental arc lengths. In addition, an arc length ratio based on the incremental arc lengths or the accumulated arc lengths may be determined to indicate performance or conversion efficiency of catalytic converter 30. Preferably, the arc length ratio is determined according to:

$$R = \frac{\Sigma \sqrt{(S1_{i+1} - S1_i)^2 + (t_{i+1} - t_i)^2}}{\Sigma \sqrt{(S2_{i+1} - S2_i)^2 + (t_{i+1} - t_i)^2}} \quad (10)$$

where R represents the ratio, S1 represents the downstream sensor signal, S2 represents the upstream sensor signal, t represents time, and i represents a sample number.

The arc length ratio may be monitored over time to monitor conversion efficiency of catalytic converter 30 by comparing the arc length ratio to previously determined arc length ratios. The arc lengths and corresponding ratio may be repeatedly determined under all operating conditions of engine 12 and monitored only when predetermined global and local entry conditions are met. Alternatively, the arc lengths and corresponding ratio may be determined only during test periods where global and local entry conditions are met. This reduces variation due to factors unrelated to catalyst conversion efficiency.

Figure 3:
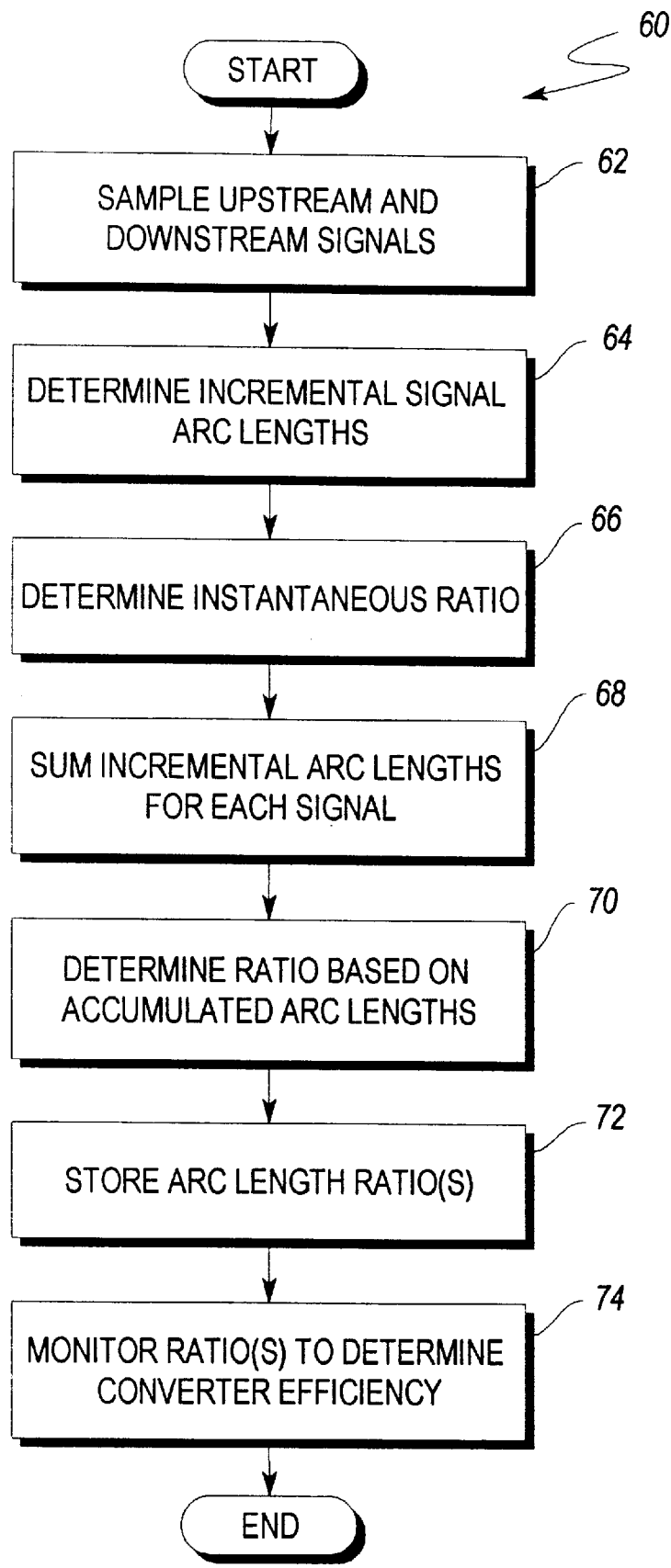
FIG. 3 is a flow diagram illustrating the general operation of a system or method according to the present invention.

Referring now to FIG. 3, a flow diagram generally illustrating operation of a system or method according to the present invention is shown. As will be appreciated by one of ordinary skill in the art, the flow diagram represents control logic which may be implemented in hardware, software, or a combination of hardware and software. Preferably, the control logic is stored in a computer readable medium, such as a PROM, EPROM, EEPROM, or flash memory, and represents program instructions which may be executed by a microprocessor. Of course, other implementations of the control logic using discrete components and/or custom integrated circuits, such as ASICs, are possible without departing from the spirit or scope of the present invention. One of ordinary skill in the art will also recognize that the particular order or sequence illustrated is not necessarily required to achieve the goals and objects of the present invention. Sequential operation of a system or method is shown for ease of illustration and description only. As such, various programming and processing strategies may be used, such as interrupt-driven processing, parallel processing, or the like, depending upon the particular application and implementation.

Flow diagram 60 begins with block 62 which represents sampling the upstream and downstream sensor signals. At least two samples for each of the upstream and downstream signals are stored for processing. Block 62 may include appropriate signal filtering and scaling depending upon the particular application. The signal samples are used to determine incremental arc lengths as represented by block 64. Preferably, adjacent or consecutive signal samples, i.e. samples taken during consecutive sample periods, are used for increased accuracy. However, non-adjacent or non-consecutive signal samples may be used to reduce the number of computations required although a coarser approximation of the line integral will result. The incremental signal arc lengths approximate the line integral for the signal as described above.

An instantaneous ratio based on the incremental signal arc lengths may be determined as indicated by block 66. The instantaneous ratio may be based on a single sample period or a number of sample periods occurring during a predefined event, such as a completed monitor cycle or trip. The incremental arc lengths for each signal are accumulated or summed as represented by block 68. A ratio based on the accumulated arc lengths may then be determined as indicated by block 70. Preferably, where instantaneous ratios are used, both the instantaneous ratio and the ratio based on the accumulated arc lengths are calculated using the arc length of the downstream signal divided by the arc length of the upstream signal. The instantaneous ratio and/or the ratio based on accumulated arc lengths is stored as represented by block 72. The stored ratio(s) may then be used to monitor conversion efficiency of the catalytic convertor as represented by block 74. By comparing the instantaneous ratio and/or the ratio based on accumulated arc lengths with previously determined corresponding ratios, the performance of the convertor may be monitored over time.

As such, the present invention monitors conversion efficiency or performance of a catalytic convertor using the arc lengths of upstream and downstream exhaust gas sensor signals. By using both the horizontal and vertical components of the sensor signals, the present invention provides a catalyst monitor having superior sensitivity relative to prior art systems and methods.

While the best modes for carrying out the invention have been described in detail, those familiar with the art to which this invention relates will recognize various alternative designs and embodiments for practicing the invention as defined by the following claims.

What is claimed is:

1. A system for monitoring exhaust gas conversion efficiency of a catalytic converter during operation of an internal combustion engine coupled to the catalytic converter, the system comprising:
   an upstream exhaust gas sensor interposed the engine and the catalytic converter for generating a first signal based on the exhaust gas upstream of the converter;
   a downstream exhaust gas sensor interposed the catalytic converter and atmosphere for generating a second signal based on the exhaust gas downstream of the converter; and
   control logic in communication with the upstream and downstream exhaust gas sensors for sampling the first and second signals once during each processing loop to determine a horizontal signal component corresponding to a time sub-interval between consecutive processing loops and a vertical signal component corresponding to a voltage for the upstream and downstream sensors, processing the first and second signals to determine corresponding first and second incremental signal lengths, summing the incremental signal lengths over a plurality of processing loops to determine corresponding accumulated signal lengths and monitoring the conversion efficiency of the catalytic converter based on a ratio of the accumulated first and second signal lengths.

2. The system of claim 1 further comprising control logic for determining a linear approximation of the first and second signal lengths corresponding to distance between consecutive signal samples for each of the first and second signals, respectively.

3. The system of claim 1 further comprising control logic for determining a ratio of upstream and downstream sensor signal arc lengths according to:

$$R = \frac{\Sigma \sqrt{(S1_{i+1} - S1_i)^2 + (t_{i+1} - t_i)^2}}{\Sigma \sqrt{(S2_{i+1} - S2_i)^2 + (t_{i+1} - t_i)^2}}$$

to account for unequal time sub-intervals between consecutive processing loops where: R represents the ratio, S1 represents the downstream sensor signal, S2 represents the upstream sensor signal, t represents time, and i represents a sample number.

4. The system of claim 1 wherein the upstream and downstream sensors generate voltage signals in response to presence or absence of oxygen in the exhaust.

5. A method for monitoring performance of a catalytic converter coupled to an exhaust of an engine using an upstream exhaust gas sensor disposed between the engine and the catalytic converter and a downstream exhaust gas sensor disposed between the catalytic converter and atmosphere, the upstream and downstream exhaust gas sensors generating first and second signals based on the exhaust before and after the catalytic converter, respectively, the method comprising:
   sampling the first and second signals once during each of at least two consecutive processing loops to generate at least two signal samples for each of the first and second signals;
   determining corresponding incremental signal lengths for the first and second signals based on voltage levels of the at least two signal samples and elapsed time between the at least two consecutive processing loops to accommodate unequal time sub-intervals between signal samples;
   accumulating the incremental signal lengths for the first and second signals, respectively;
   determining a signal length ratio based on the accumulated signal lengths; and monitoring the performance of the catalytic converter based on the ratio.

6. A computer readable storage medium for use with an engine controller for monitoring performance of a catalytic converter, the computer readable medium comprising:
   control logic for sampling first and second signals generated by corresponding first and second exhaust gas sensors once each processing loop for at least two consecutive processing loops, determining corresponding incremental signal lengths for the first and second signals based on at least two signal samples for each of the first and second signals and elapsed time between the at least two signal samples to accommodate variation in processing loop timing, generating an accumulated signal length for each signal based on the incremental lengths, and monitoring the performance of the catalytic converter based on the accumulated lengths of the first and second signals.

7. The computer readable storage medium of claim 6 further comprising control logic for determining a signal length ratio by dividing the accumulated signal length corresponding to the second signal by the accumulated signal length corresponding to the first signal.

* * * * *